United States Patent [19]

Siebels

[11] Patent Number: 4,893,603
[45] Date of Patent: Jan. 16, 1990

[54] LOW PRESSURE FUEL INJECTION SYSTEM WITH FUEL PREHEATING FOR AN AIR-COMPRESSING, INJECTION INTERNAL COMBUSTION ENGINE

[75] Inventor: Karl-Heinz Siebels, Stuttgart, Fed. Rep. of Germany

[73] Assignee: Daimler-Benz AG, Stuttgart, Fed. Rep. of Germany

[21] Appl. No.: 176,278

[22] Filed: Mar. 31, 1988

[30] Foreign Application Priority Data

Mar. 31, 1987 [DE] Fed. Rep. of Germany ....... 3710807

[51] Int. Cl.⁴ .................... F02M 31/12; F02M 37/18; F02M 37/22; F02M 55/00
[52] U.S. Cl. ..................................... 123/514; 123/510
[58] Field of Search ............... 123/514, 510, 511, 557, 123/549

[56] References Cited

U.S. PATENT DOCUMENTS

| | | | |
|---|---|---|---|
| 2,599,699 | 6/1952 | Dilworth et al. .................... | 123/514 |
| 4,187,813 | 2/1980 | Stumpp ................................ | 123/510 |
| 4,432,329 | 2/1984 | Rédelé123 .................................. | 514/ |
| 4,440,138 | 4/1984 | Smith .................................. | 123/514 |
| 4,454,848 | 6/1984 | Duprez . | |
| 4,478,197 | 10/1984 | Yasuhara et al. .................... | 123/514 |
| 4,481,931 | 11/1984 | Bruner ................................ | 123/514 |
| 4,491,119 | 1/1985 | Fefeu . | |
| 4,519,358 | 5/1985 | Redele . | |
| 4,600,825 | 7/1986 | Blazejovsky . | |
| 4,770,150 | 9/1988 | Frankle et al. ...................... | 123/510 |

FOREIGN PATENT DOCUMENTS

| | | | |
|---|---|---|---|
| 0973439 | 8/1985 | Canada . | |
| 3034730 | 4/1981 | Fed. Rep. of Germany . | |
| 3201149 | 10/1982 | Fed. Rep. of Germany . | |
| 3503728 | 8/1985 | Fed. Rep. of Germany . | |
| 3507462 | 9/1985 | Fed. Rep. of Germany . | |
| 3538360 | 11/1986 | Fed. Rep. of Germany . | |
| 0723203 | 3/1980 | U.S.S.R. .............................. | 123/510 |
| 2031994 | 4/1980 | United Kingdom ................ | 123/511 |

OTHER PUBLICATIONS

ATZ-Automobittechnische Zeitschrift 85 (11-1983), pp. 667-677, "The New Mercedes-Benz 2.0.L Four-Cylinder Diesel Engine for the 1900 Passenger Car".

Primary Examiner—Willis R. Wolfe
Assistant Examiner—M. Macy
Attorney, Agent, or Firm—Barnes & Thornburg

[57] ABSTRACT

A low pressure fuel system with fuel preheating for an air-compressing, injection internal combustion engine, in which system, a heat exchanger effective at low fuel temperature with a down-stream fine filter is provided in a supply main leading to the high pressure injection pump and a shut-off valve controlled as a function of the fuel temperature is provided in a return main leading away from the high pressure injection pump.

6 Claims, 1 Drawing Sheet

LOW PRESSURE FUEL INJECTION SYSTEM WITH FUEL PREHEATING FOR AN AIR-COMPRESSING, INJECTION INTERNAL COMBUSTION ENGINE

BACKGROUND AND SUMMARY OF THE INVENTION

The invention concerns a low pressure fuel system with fuel preheating for an air-compressing, injection internal combustion engine.

Because, at very low temperatures, diesel fuels precipitate paraffin particles which rapidly block the fine filter and adversely affect the driving operation, measuring as provided in a known manner for heating the fuel in fuel systems. Thus, for example, in a known design (ATZ 10 Automobiltechnische Zeitschrift 85 (1983) 11, p. 671), a switch-over valve controlled as a function of fuel temperature is located in a supply main leading to the feed pump downstream of a suction filter designed as a prefilter. This switch-over valve makes it possible to divert the fuel induced by the feed pump through a heating-water/fuel heat exchanger at low temperatures but removes the diversion to the heat exchanger at higher fuel temperatures so that the fuel can flow directly to the feed pump without diversion. Operational faults can scarcely be avoided, however, because the prefilter tends to become blocked at low temperatures because of paraffin precipitations in the fuel.

A remedy is provided by the arrangement in accordance with German Patent Specification 3,538,360, in which the switch-over valve and the prefilter, which form one structural unit, are arranged in such a way that, because of the special flow path, the prefilter also falls within the compass of the heated fuel.

Both the arrangements previously mentioned, have a common disadvantage. Immediately after starting of the internal combustion engine, there is still not a sufficient quantity of cooling water heat available for heating the diverted fuel. The danger of blockage cannot therefore be excluded.

The use of electrical preheating, previously known from German Offenlegungsschrift 3,034,730, is also a disadvantage to the extent that excessive demands are made of the battery capacity of the vehicle.

Finally, a solution is proposed in the as yet German unpublished patent application P 36 31 579.6-13 in which, by arranging an overpressure valve in a bypass around the fine filter, the fuel first flows into the filter casing of the prefilter before the time when the opening pressure is reached because of the accumulation of paraffin and the fuel then passes into the injection pump via the bypass.

This solution, however, does not make it possible to avoid impurities arriving unhindered in the injection pump or even in the internal combustion engine during the period when the bypass is open.

The object of the invention is to avoid the disadvantages described by a simple measure.

This object is achieved by providing shut-off valve in the return main of a high pressure injection pump and controlling the shut-off valve by a thermostatic element in the supply main to the injection pump.

The effect that only the quantity of fuel required for combustion in the internal combustion engine is passed through the filter is achieved by shutting off the fuel return when the temperature is low.

The smaller quantity of fuel, corresponding to the instantaneous fuel consumption, is heated more rapidly. Operational interruptions due to blocking of the filter are avoided. The filtering capability is ensured.

An advantageous measure for the invention results by arranging a temperature sensing element, for example a thermostat, which triggers the shut-off valve as a function of temperature, in the supply main.

The insertion in the supply main of a temperature responsive expansion material operating element, which controls the shut-off valve steplessly, should be considered as a preferred measure of the invention.

A useful extension of the invention is obtained by providing an overflow valve in the return main downstream of the steplessly operating shut-off valve. Because of the special position of this overflow valve, a pressure balance is achieved on the fuel supply side and fuel return side of the shut-off valve so that load is removed from the expansion material operating element.

Other objects, advantages and novel features of the present invention will become apparent from the following detailed description of the invention when considered in conjunction with the accompanying drawings.

DETAILED DESCRIPTION OF THE DRAWINGS

Figure 1:
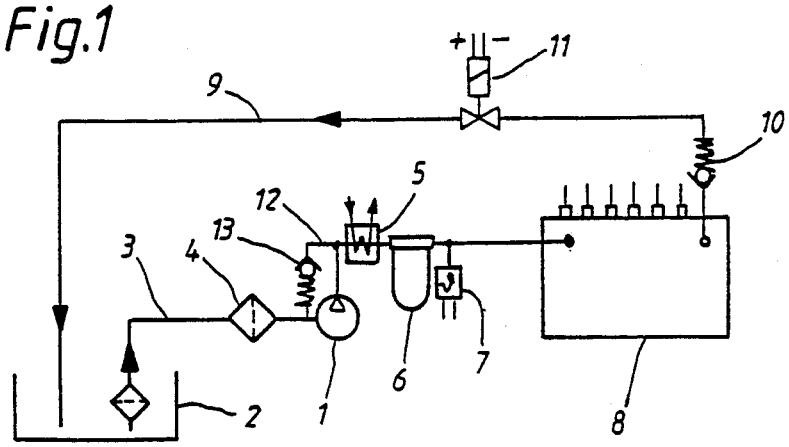
FIG. 1 is a schematic of a fuel system with the shut-off valve provided in the return main according to the principles of the present invention.
Figure 2:
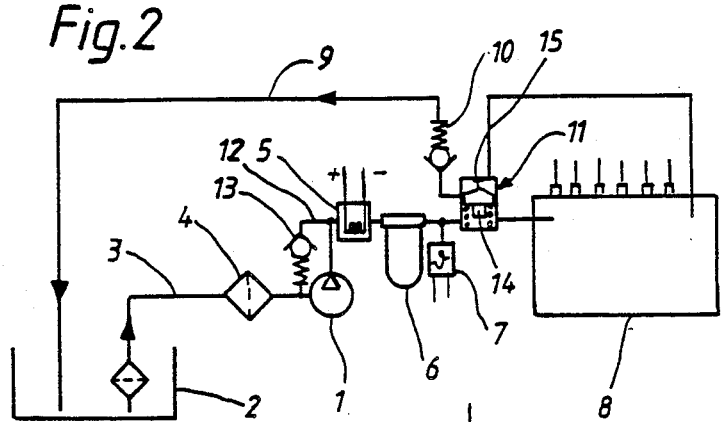
FIG. 2 is a schematic of a shut-off valve in another embodiment of the present invention.

In the fuel system, shown in FIGS. 1 and 2, for an air-compressing, injection internal combustion engine, a feed pump 1 induces the fuel from a fuel tank 2 through a supply main 3 via a suction filter 4 acting as a prefilter and feeds the fuel via a heat exchanger 5, a main fine filter 6 and a thermostat switch 7 to a high pressure injection pump 8. From this high pressure injection pump 8, excess fuel passes to a return main 9 leading to the fuel tank 2. The return main 9 has an overflow valve 10 and a shut-off valve 11 operating as a function of the fuel temperature.

The shut-off valve 11 shown in FIG. 1, is designed as a magnetic shut-off valve and is triggered by the thermostat 7 inserted in the supply main 3. In this arrangement, as soon as the fuel temperature falls to a predetermined temperature below 0° centigrade, the thermostat 7 causes an interruption of the fuel return by causing the shut-off valve 11 to adopt the closed position. In this switching position, only the fuel quantity corresponding to the instantaneous fuel consumption reaches the high pressure injection pump 8. The excess part of the fuel fed by the feed pump 1 drains via a feedback main 12 and pressure limiting valve 13. The feedback main, branches off upstream of the heat exchanger 5 connected to the cooling water circuit and enters the supply main 3 between the prefilter 4 and the feed pump 1.

Figure 3:
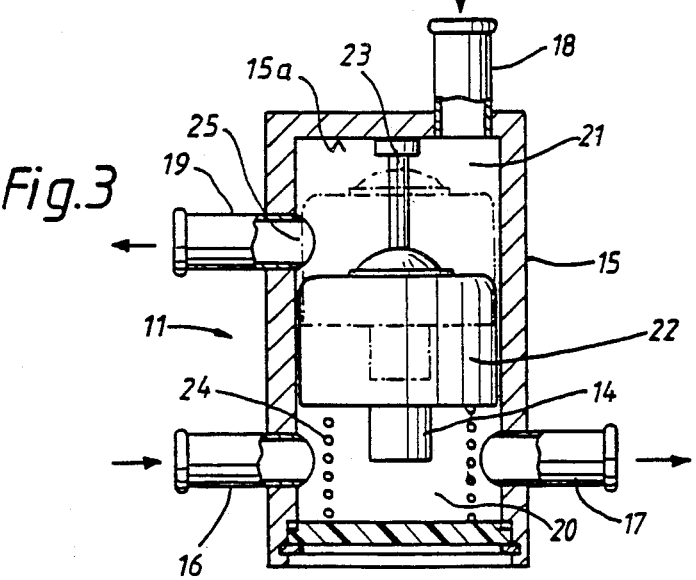
FIG. 3 is a cross section of a shut-off valve to a larger scale according to the principles of the present invention.

In the fuel system of FIG. 2, the shut-off valve 11 is provided with an expansion material operating element 14. The control unit casing 15 of this shut-off valve 11 has, in addition to the inlet and outlet end connections 18, 19 of the fuel return, inlet and outlet end connections 16, 17 for the fuel supply (FIGS. 2 and 3). The sensor end part of the control unit casing 15 is located in the supply main section between the thermostat 7 and the high pressure injection pump 8. The supply pressure space 20 and the return pressure space 21 are separated from one another by a control piston 22. The position of the control piston 22 shown in FIG. 3 is the position initially adopted in the case of warm fuel temperatures.

The control piston 22 shown chain-dotted is located in the operating position occurring in the case of low fuel temperatures, in which position the outlet end connection 19 of the return is closed. A stroke rod 23 is supported on the casing end wall 15a and extends through control piston 22 into the expansion material operating element 11. When the fuel is heated, the expansion material operating element 14 expands to apply a force to the end of stroke rod 23 so that the control piston 22 is displaced in the direction of the sensor end along its stroke rod 23, against the force of a compression spring 24. The passage opening 25 of the outlet end connection 19 increases at the same time.

In FIG. 2, The overflow valve 10 is located downstream of the shut-off valve 11 in order to achieve a pressure balance between the supply pressure space 20 and the return pressure space 21 for the purpose of removing load from the expansion material operating element.

In the illustrative example of FIG. 2, the thermostat 7 controls the heat exchanger 5, which is designed as an electrical fuel heating unit.

Because of the smaller fuel quantities when the return is switched off, the electrical heating requires substantially less power. In consequence, there are no unallowably high demands on the electrical capability of the vehicle.

Although the present invention has been described and illustrated in detail it is to be clearly understood that the same is by way of illustration and example only, and is not to be taken by way of limitation. The spirit and scope of the present invention are to be limited only by the terms of the appended claims.

What is claimed:

1. Low pressure fuel system with fuel preheating for an air-compressing, injection internal combustion engine, having a supply main connected to a fuel tank and leading via a feed pump to a high pressure injection pump: a heat exchanger effective at low fuel temperature, a prefilter and a fine filter are in said supply main, a return main between the high pressure injection pump and the fuel tank; said high pressure injection pump; and a shut-off valve means in the return main for interrupting fuel return at low fuel temperatures without return to said main supply; and a thermostat in the supply main between said prefilter and said high pressure injection pump, for controlling fuel flow to aid heat exchanger.

2. Low pressure fuel system according to claim 1, wherein said shut-off valve means includes an expansion material operating element operating as a thermostat and interacting with the fuel in said supply main and a control piston which steplessly controls the flow of fuel in said return main in response to said expansion material.

3. Low pressure fuel system according to claim 2, including an overflow valve in the return main downstream of said shut-off valve.

4. Low pressure fuel system according to claim 1, including an overflow valve in the return main downstream of said shut-off valve.

5. Low pressure fuel system according to claim 1, including an overflow valve connecting the output of the feed pump to the input of said feed pump to feed back fuel as needed when said shut-off valve means is closed.

6. Low pressure fuel system according to claim 1, wherein said thermostat is downstream of said heat exchanger.

* * * * *